(12) United States Patent
Yamamoto

(10) Patent No.: US 6,618,437 B1
(45) Date of Patent: Sep. 9, 2003

(54) DIGITAL BROADCASTING RECEIVER AND DIGITAL BROADCASTING SYSTEM

(75) Inventor: Yuji Yamamoto, Yawata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/324,730

(22) Filed: Jun. 3, 1999

(30) Foreign Application Priority Data

Jun. 3, 1998 (JP) .......................................... 10-155030

(51) Int. Cl.$^7$ .......................... H04B 1/66; H04N 15/00; H04N 7/12
(52) U.S. Cl. ....................... 375/240; 348/42; 348/385.1
(58) Field of Search .......................... 348/385.1, 489.1, 348/440, 458, 459, 43, 42, 47, 48; 375/240, 240.1, 240.28; 725/138

(56) References Cited

U.S. PATENT DOCUMENTS

| | | | | |
|---|---|---|---|---|
| 5,193,000 A | * | 3/1993 | Lipton et al. | 348/385.1 |
| 5,661,518 A | * | 8/1997 | Palm et al. | 348/42 |
| 5,870,137 A | * | 2/1999 | Stuettler | 348/51 |
| 6,357,045 B1 | * | 3/2002 | Devaney | 725/138 |

FOREIGN PATENT DOCUMENTS

JP 10-174064 6/1998

OTHER PUBLICATIONS

"Development of CS Digital Broadcasting System Prototype for 525–Progressive Scanning Signal," ITE Technical Report, vol. 20, No. 13, pp. 25–30, Feb. 27, 1996.

* cited by examiner

*Primary Examiner*—Gims S. Philippe
(74) *Attorney, Agent, or Firm*—Arent Fox Kintner Plotkin & Kahn

(57) ABSTRACT

On the side of a transmitter in a digital broadcasting system, a multiplexed picture is produced by multiplexing a plurality of pictures using a frame memory device. A video encoder encodes the multiplexed picture so as to realize a prescribed correspondence between a field type (even, odd) and a displaying order. Thus, a plurality of encoded pictures having the GOP structure are produced. The encoded pictures are transmitted to a receiver in the digital broadcasting system by using a one-channel transmission path. On the receiver side, decoding is carried out on a GOP basis and formatting is carried out according to the displaying order.

10 Claims, 9 Drawing Sheets

FIG. 3A PICTURE ORDER IN GOP

FIG. 3B DISPLAYING ORDER

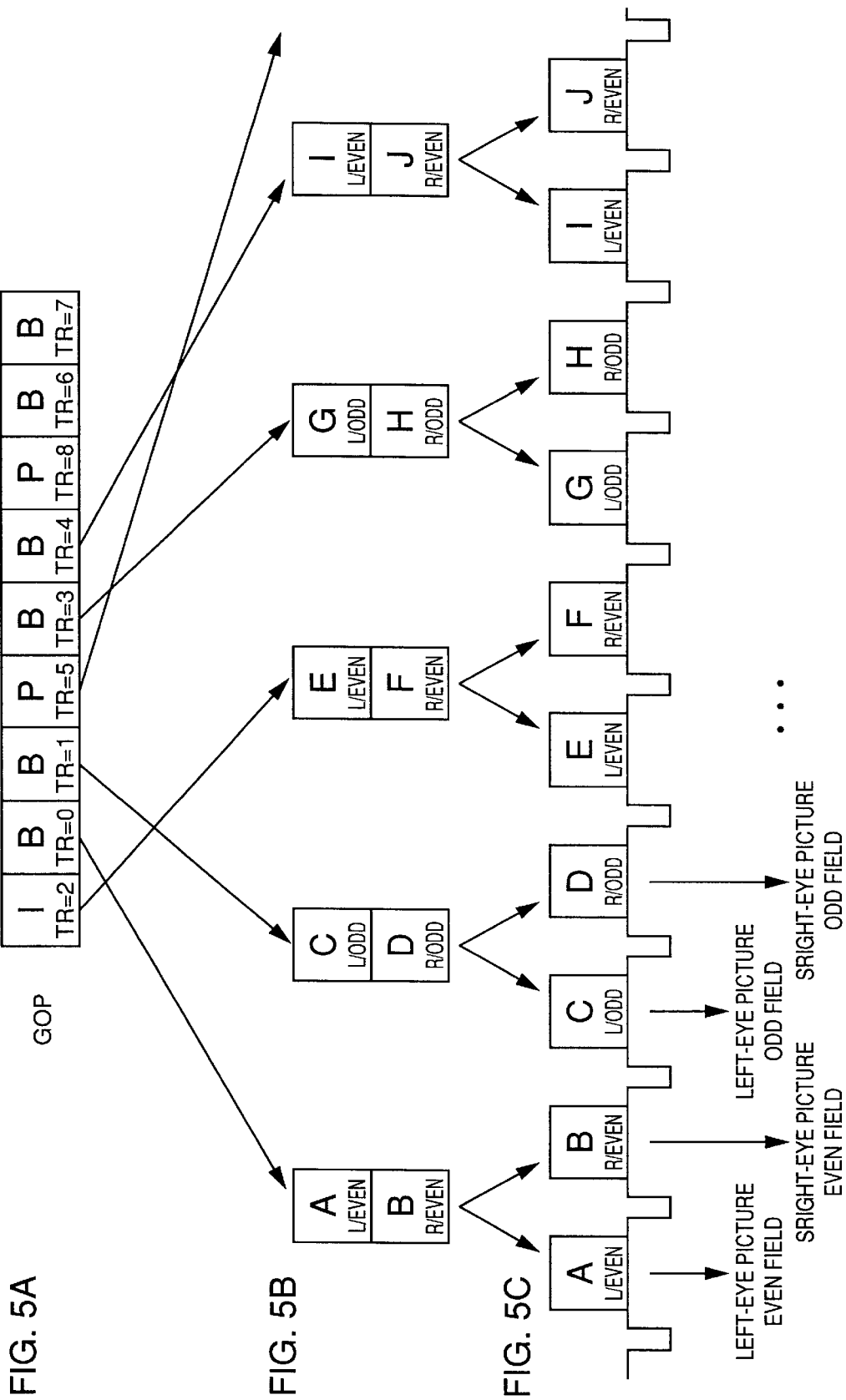

525P FORMAT
VERTICAL FREQUENCY 60Hz
HORIZONTAL FREQUENCY 31.5KHz

STEREOSCOPIC FORMAT(1)
VERTICAL FREQUENCY 120Hz
HORIZONTAL FREQUENCY 31.5KHz

STEREOSCOPIC FORMAT(2)
=NTSC 2CHANNEL
VERTICAL FREQUENCY 60Hz
HORIZONTAL FREQUENCY 15.75KHz

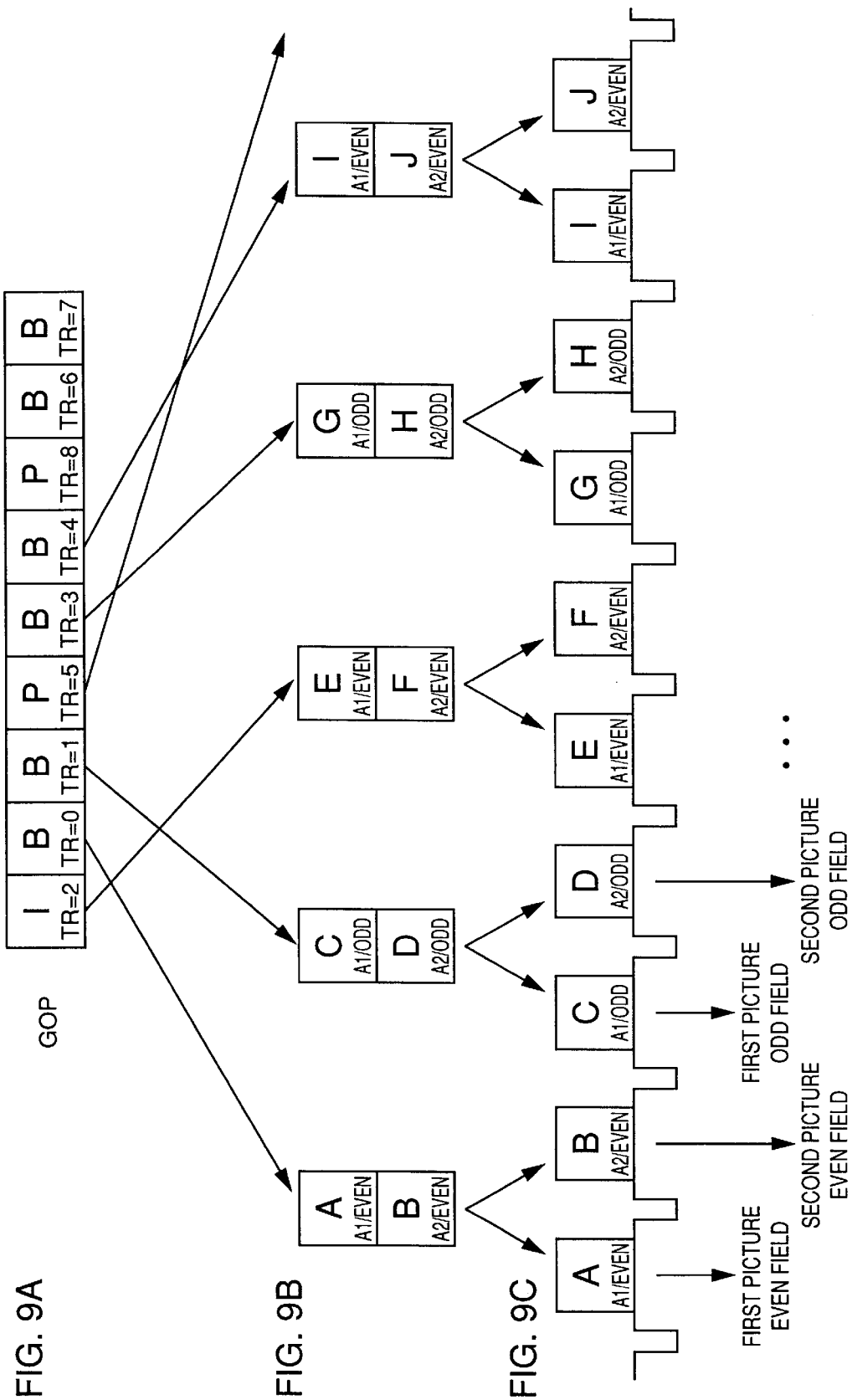

DIGITAL BROADCASTING RECEIVER AND DIGITAL BROADCASTING SYSTEM

BACKGROUND OF THE INVENTION

1. Field of the Invention

The present invention relates to digital broadcasting receivers and systems and, more particularly, to a digital broadcasting receiver and system capable of transmitting, using a one-channel transmission path, and reproducing a multiplexed picture that is formed by multiplexing a plurality of pictures.

2. Description of the Background Art

The non-interlace digital broadcasting system using the 525p sequential scanning method has been an example of the digital broadcasting system. The details of the non-interlace digital broadcasting system are disclosed, for example, in Urano et al., "Development of CS Digital Broadcasting System Prototype for 525-Progressive Scanning Signal," ITE Technical Report, Vol. 20, No. 13, pp. 25–30, Feb. 27, 1996.

The non-interlace digital broadcasting system provides broadcasting service by using picture data for the non-interlace scanning method that is different from the current interlace scanning (NTSC) method.

The inventor proposed a digital stereoscopic broadcasting system for transmitting and receiving right-eye and left-eye pictures, which are obtained by the interlace scanning method, along a one-channel transmission path by converting the pictures into a one-frame multiplexed picture for the non-interlace scanning method (Japanese Patent Laying-Open No. 10-174064). According to the digital stereoscopic broadcasting system, stereoscopic broadcasting service can be provided through a one-channel transmission path.

A transmitter of the digital stereoscopic broadcasting system alternately transmits odd and even fields of multiplexed picture data along a one-channel transmission path. Meanwhile, a receiver has to return the received, one-channel multiplexed picture to the right-eye and left-eye pictures for the two-channel interlace scanning method and appropriately format the pictures according to the field types.

However, the receiver does not have the function of determining whether a picture to be formatted corresponds to an odd field or an even field. It is therefore likely that an picture is reproduced and displayed with a mistaken exchange of odd and even fields. This problem occurs even when a picture other than a stereoscopic picture is to be transmitted by multiplexing.

SUMMARY OF THE INVENTION

An object of the present invention is to provide a digital broadcasting system capable of transmitting an encoded multiplexed picture along a one-channel path and properly reproducing and displaying the picture.

According to one aspect of the present invention, a digital broadcasting system includes a picture producing circuit for producing a plurality of multiplexed pictures each formed of a plurality of original pictures and encoding the plurality of multiplexed pictures to produce a plurality of encoded pictures, a transmitting circuit for transmitting an output of the picture producing circuit to a one-channel transmission path, a receiving circuit for receiving an output of the transmitting circuit through the one-channel transmission path, a decoder for decoding the plurality of encoded pictures received in the receiving circuit to reproduce the plurality of multiplexed pictures and sequentially outputting the pictures according to a displaying order, and a formatting circuit for formatting the reproduced multiplexed pictures output from the decoder based on a field type according to the displaying order, the field type being an even field or an odd field, and the picture producing circuit producing the plurality of encoded pictures so as to realize a prescribed correspondence between the field type and the displaying order.

Preferably, the plurality of multiplexed pictures include a multiplexed picture in the even field and a multiplexed picture in the odd field, the picture producing circuit includes a multiplexing circuit for alternately producing and outputting the multiplexed picture corresponding to the even field and the multiplexed picture corresponding to the odd field from a prescribed one of them, and an encoder for starting encoding from a multiplexed picture that is output first from the multiplexing circuit and adding reference data indicating the displaying order to each of the plurality of encoded pictures, and the formatting circuit adds, to the reproduced multiplexed picture, a synchronous signal corresponding to the even field or a synchronous signal corresponding to the odd field according to whether the reference data of the reproduced multiplexed picture is odd or even.

Preferably, the plurality of encoded pictures form a GOP structure based on the MPEG method, and the picture producing circuit encodes the plurality of multiplexed pictures so that a prescribed one of the even field and the odd field comes first in the displaying order when the pictures are decoded.

According to the digital broadcasting system of the present invention, the encoded pictures are produced so as to realize a prescribed correspondence between the field type and the displaying order based on a rule between the transmitting and receiving sides. Thus, the receiving side can discriminate the field type (odd and even fields) of the reproduced pictures by decoding the encoded pictures. As a result, proper formatting (that is, reproducing and displaying) can be made possible. Further, by multiplexing and encoding a plurality of original pictures based on a rule between the transmitting and receiving sides, the receiving side can properly format original pictures.

Another object of the present invention is to provide a digital broadcasting receiver capable of properly reproducing and displaying an encoded multiplexed picture received by using a one-channel path.

According to another aspect of the present invention, a digital broadcasting receiver includes a receiving circuit for receiving, through a one-channel transmission path, a plurality of encoded pictures that are produced by encoding a plurality of multiplexed pictures each including a plurality of original pictures, a decoder for decoding the received plurality of encoded pictures to reproduce the plurality of multiplexed pictures and sequentially outputting the pictures according to a displaying order, and a formatting circuit for formatting the reproduced multiplexed pictures output from the decoder based on a field type according to the displaying order, the plurality of encoded pictures each having reference data attached thereto indicating a displaying order, the field type being an even field or an odd field, and an encoded picture having prescribed reference data of the plurality of encoded pictures corresponding to a prescribed one of the even field and the odd field.

Preferably, the plurality of multiplexed pictures alternately include a multiplexed picture corresponding to the even field and a multiplexed picture corresponding to the odd field, an encoded picture having odd reference data of the plurality of encoded pictures corresponds to a prescribed one of the even field and the odd field, and the formatting circuit adds, to the reproduced multiplexed pictures, a synchronous signal corresponding to the even field or a synchronous signal corresponding to the odd field according to whether the reference data is odd or even.

Preferably, the plurality of multiplexed pictures are encoded so that a prescribed one of the even field and the odd field comes first in the displaying order when the pictures are decoded.

According to the digital broadcasting receiver of the present invention, the field type (odd and even fields) of a reproduced picture can be discriminated by decoding a received encoded picture based on a rule between the transmitting and receiving sides. Thus, proper formatting (that is, reproducing and displaying) can be made possible. Especially, the receiving side can properly format original pictures based on the rule between the transmitting and receiving sides even for such multiplexed pictures that are formed by multiplexing a plurality of original pictures.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5A to 5C are diagrams for describing an operation of the receiver in the first embodiment.

FIGS. 9A to 9C are diagrams for describing an operation of the receiver in the second embodiment.

DESCRIPTION OF THE PREFERRED EMBODIMENTS

First Embodiment

Figure 1:
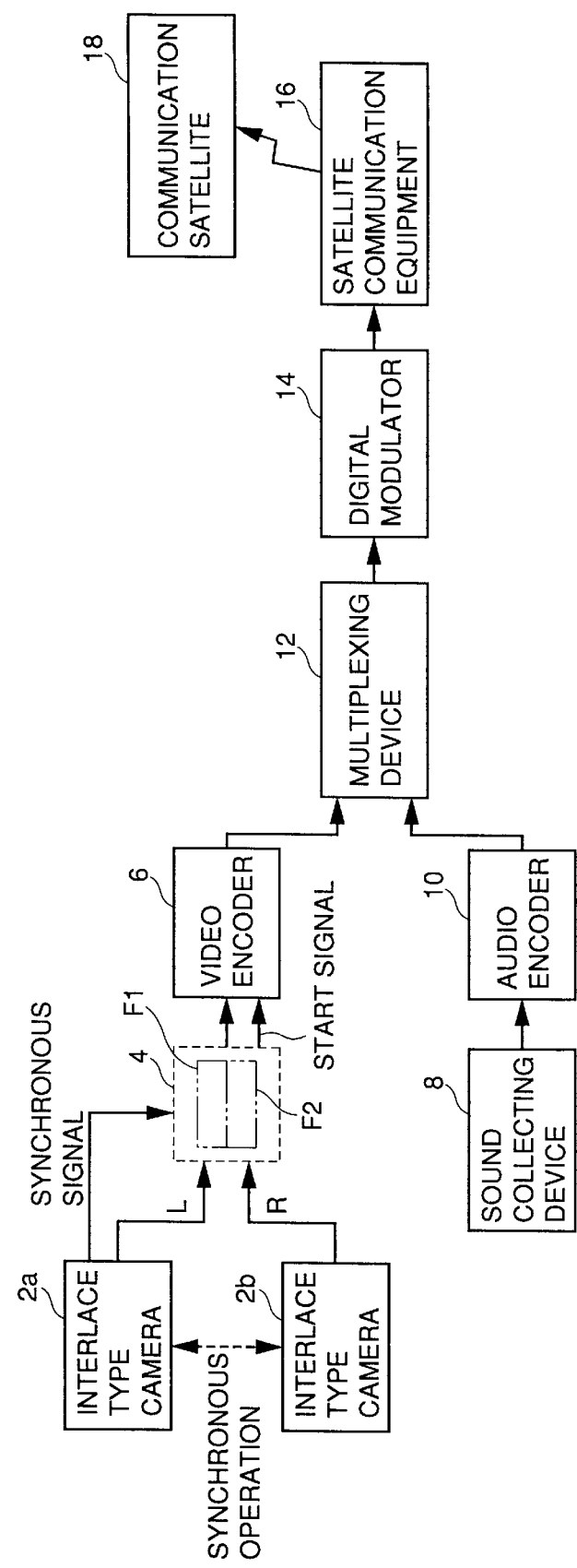
FIG. 1 is a block diagram for describing one example of the structure of a transmitter in a digital broadcasting system in a first embodiment.

One example of the structure of a transmitter in a digital broadcasting system in a first embodiment will be described with reference to FIG. 1. The transmitter in the first embodiment multiplexes right-eye and left-eye pictures that form a stereoscopic picture and encodes the produced multiplexed picture according to a predetermined procedure. Referring to FIG. 1, the transmitter in the digital broadcasting system includes interlace type cameras 2a, 2b, and a picture producing circuit including a frame memory device 4 and a video encoder 6.

Interlace type cameras 2a, 2b (hereinafter, referred to as cameras 2a, 2b) are used as the input devices of video data. Cameras 2a, 2b are simultaneously operated to pick up a stereoscopic picture. Camera 2a outputs left-eye picture data L while camera 2b outputs right-eye picture data R.

Frame memory device 4 receives a total of two fields of picture data from cameras 2a, 2b, converts the picture data into one flame of picture data (multiplexed picture data), and outputs the converted picture data. Frame memory device 4 includes two field memories F1, F2. Left-eye picture data L received from camera 2a is written to field memory F1 while right-eye picture data R received from camera 2b is written to field memory F2. Picture data is read from one field memory at a speed twice as high as the writing speed and, thereafter, picture data is read from the other field memory at a speed twice as high as the writing speed. Thus, a multiplexed picture that includes the right-eye and left-eye pictures in one frame is produced.

One example of the picture configuration corresponding to a multiplexed picture in the first embodiment will be described with reference to FIGS. 2A to 2C. FIGS. 2A and 2B show one example of the picture configuration corresponding to left-eye and right-eye pictures, respectively, and FIG. 2C shows one example of the configuration of a picture (referred to as a multiplexed picture) corresponding to a multiplexed picture.

Figure 2:
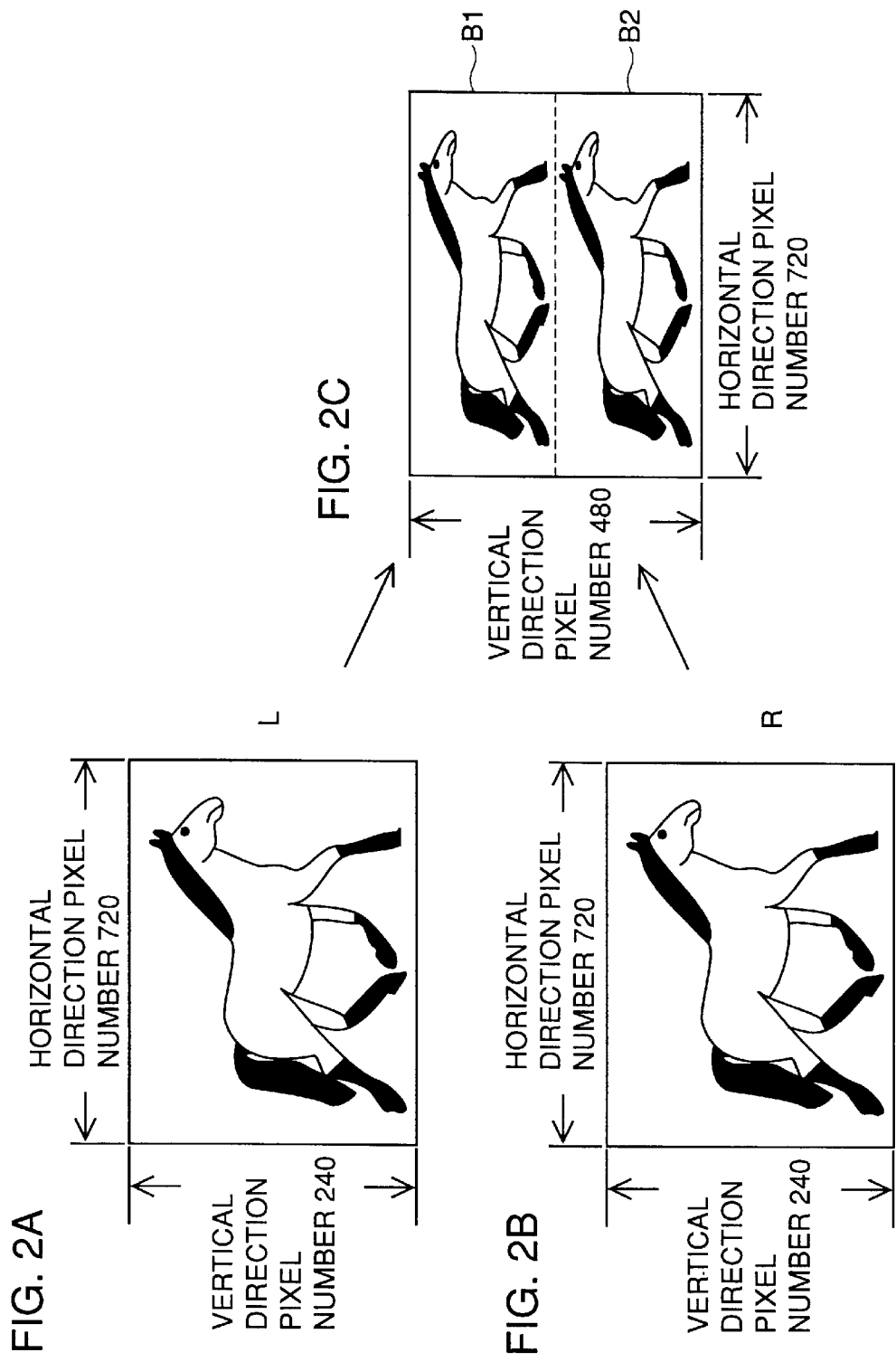
FIGS. 2A to 2C are conceptual diagrams for describing one example of the picture configuration of multiplexed picture data in the first embodiment.

Referring to FIGS. 2A and 2B, it is assumed that the effective pixel number of a picture corresponding to interlace field data (right-eye data R, left-eye data L) is 720 for the horizontal direction and 240 for the vertical direction. It is also assumed here that the horizontal synchronous frequency FH is about 15.75 kHz (15.75/1.001 kHz) and the vertical synchronous frequency FR is about 60 Hz (60/1.001 Hz). In this case, the writing frequency for frame memory device 4 is FH and the reading frequency is (2×FH).

As shown in FIG. 2C, the effective pixel number of the multiplexed picture is 720 for the horizontal direction and 480 for the vertical direction. This corresponds to the standard picture configuration for the non-interlace scanning method. Further, the horizontal synchronous frequency is about 31.5 kHz (31.5/1.001 kHz) and the vertical synchronous frequency is about 60 Hz (60/1.001 Hz). This corresponds to the standard signal format for the non-interlace scanning method.

The multiplexed picture-is formed of two blocks B1, B2. One of blocks B1, B2 is a picture that corresponds to the right-eye picture obtained by the interlace scanning method, and the other is a picture that corresponds to the left-eye picture obtained by the interlace scanning method. In the following example, block B1 is the picture for the left-eye picture and block B2 is the picture for the right-eye picture.

Referring to FIG. 1, frame memory device 4 alternately produces and outputs multiplexed picture data in an odd field and multiplexed picture data in an even field. Video encoder 6 carries out MPED encoding (carries out encoding) according to the MPEG standard by regarding a plurality of multiplexed pictures as a unit, and outputs a plurality of encoded pictures.

Figure 3:
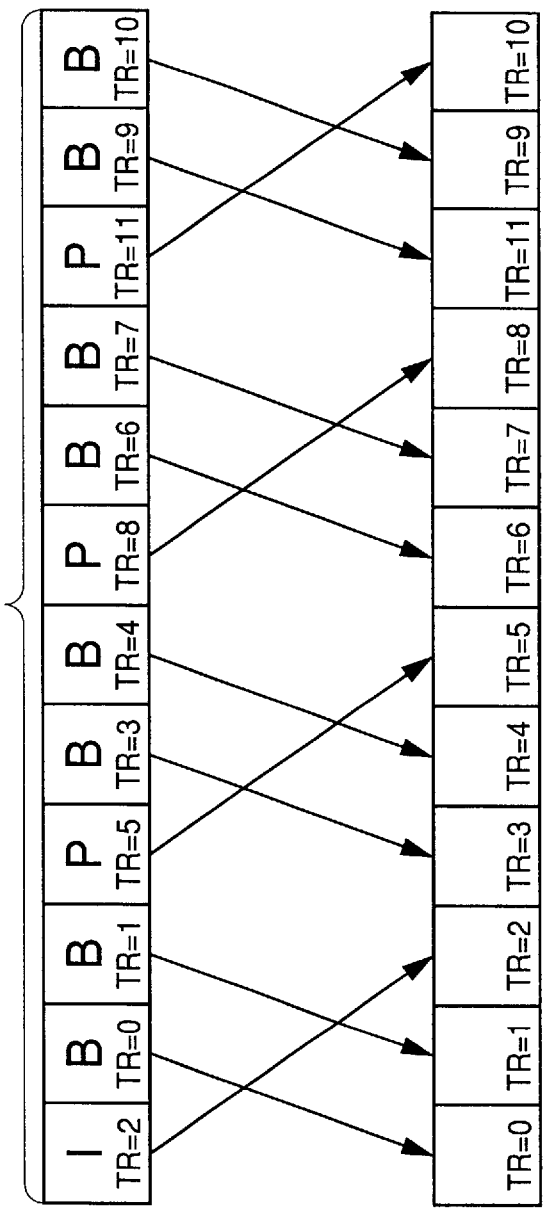
FIGS. 3A and 3B are conceptual diagrams for describing the encoding process based on the MPEG standard.

The encoding process based on the MPEG standard will be described with reference to FIGS. 3A and 3B. FIG. 3A shows the GOP (Group of Picture) structure formed of twelve encoded pictures, and FIG. 3B shows the displaying order (corresponding to the order of original pictures) for reproducing and displaying. It is noted that the arrows in FIGS. 3A and 3B indicate a correspondence between the encoded pictures forming the GOP structure and the displaying order.

An I picture, which is an intra coded picture, is predicted (encoded) based on information in the frame. A P picture is a bidirectionally predictive coded picture that is encoded from a reference picture (I or P pictures) that exist in the remotest past in time. A B picture is a bidirectionally predictive coded picture that is predicted from reference pictures (I and P pictures) that exist in the nearest past and in the nearest future in time.

In order to restructure (decode) these P and B pictures, it is necessary to decode the reference pictures in advance. In the MPEG standard encoding, therefore, the order of the encoded pictures in the GOP is different from the displaying order as shown in FIGS. 3A and 3B. Thus, the encoded pictures that form the GOP are each supplied with reference data TR (Temporal Reference) indicating the displaying order.

In the first embodiment, encoded pictures are produced so as to realize a prescribed correspondence between reference data TR and a field type included in each picture. More specifically, encoding is carried out so that a multiplexed picture in a prescribed field (even or odd) becomes an encoded picture that has prescribed reference data TR.

In the following example, when reference data TR is 0~N−1, a multiplexed picture corresponding to an even field becomes an encoded picture having "0" as reference data TR. It is also assumed that the number N of encoded pictures forming the GOP is even.

Therefore, the reading operation of frame memory device 4 is controlled by using a synchronous signal so that data that is output first from frame memory device 4 to video encoder 6, as shown in FIG. 1, is multiplexed picture data in an even field.

More specifically, the synchronous signal is supplied from camera 2a (or 2b) to frame memory device 4. Based on the synchronous signal, frame memory device 4 determines the field type of input picture data (whether it is in an even field or an odd field). In the case of picture data in an even field, production of multiplexed picture data is started by using the data. At the same time, frame memory device 4 outputs a start signal for controlling the start of encoding to video encoder 6.

Based on the start signal, video encoder 6 starts encoding in synchronization with the multiplexed picture data received from frame memory device 4. Thus, video encoder 6 carries out encoding so that a multiplexed picture in an even field, which is received first from frame memory device 4, becomes an encoded picture having "0" as reference data TR. As a result, encoding is carried out according to the rule as described above.

The transmitter in the digital broadcasting system further includes a sound collecting device 8, an audio encoder 10, a multiplexing device 12, a digital modulator 14, and satellite communication equipment 16. Sound collecting device 8 obtains sound. Audio encoder 10 encodes the obtained sound. Multiplexing device 12 multiplexes the outputs of video encoder 6 and audio encoder 10. The output of multiplexing device 12 is modulated in digital modulator 14 and transmitted to communication satellite 18 by satellite communication equipment 16. Communication satellite 18 transmits data received from satellite communication equipment 16 to a receiver.

Figure 4:
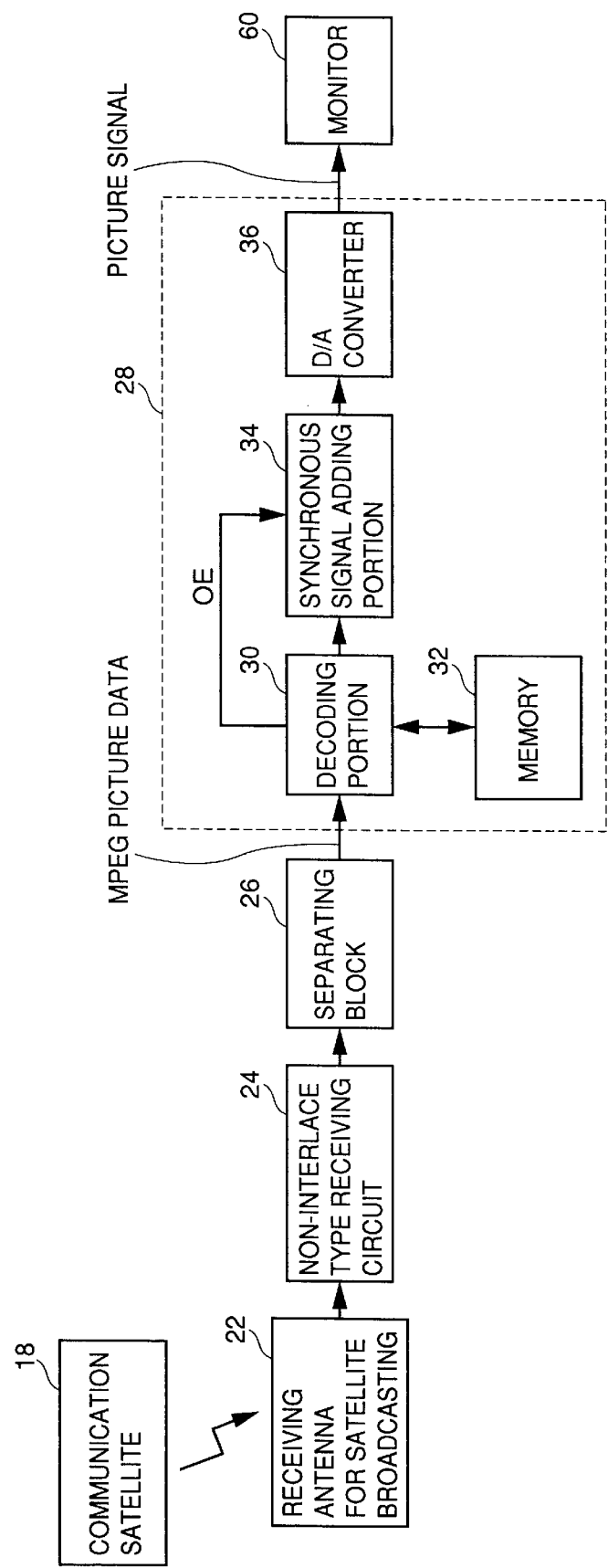
FIG. 4 is a block diagram for describing one example of the structure of a receiver in the digital broadcasting system in the first embodiment.

A receiver in the digital broadcasting system in the first embodiment will be described with reference to FIG. 4. The receiver in the first embodiment decodes an encoded multiplexed picture and formats the picture according to a rule with the transmitter. Referring to FIG. 4, the receiver includes a receiving antenna 22 for satellite broadcasting, a receiving circuit 24 for the interlace method, a separating block 26, a decoding block 28, and a monitor 60.

The receiver receives one-channel, encoded multiplexed picture data that is transmitted from communication satellite 18 by using receiving antenna 18 for satellite broadcasting. Receiving circuit 24 for the interlace method includes a tuner portion and a transmission path decoding portion (not shown), and carries out digital demodulation, error correction and the like on received data. Separating block 26 is used to separate MPEG picture data (encoded multiplexed picture data) and encoded sound data. The MPEG picture data is sent to decoding block 28.

Decoding block 28 includes a decoding portion 30, a memory 32, a synchronous signal adding portion 34, and a D/A converter 36. Decoding portion 30 decodes MPEG picture data received from separating block 26. Thus, reproduced picture data is generated. The reproduced picture data is stored in memory 32 for a while. I and P pictures of the reproduced picture data stored in memory 32 are used as reference pictures for decoding a P or B picture.

Decoding portion 30 reads the reproduced picture data based on reference data TR that is added to the MPEG picture data before reproduction (according to a displaying order). At the same time, decoding portion 30 outputs a discriminant signal OE. Discriminant signal OE indicates that reproduced picture data, which is read, corresponds to an even field if reference data TR is even (0, 2, . . . , (N−2)) and indicates that reproduced picture data, which is read, corresponds to an odd field if reference data TR is odd (1, 3, . . . , (N−1)).

Synchronous signal adding portion 34 adds a synchronous signal to the read reproduced picture data based on discriminant signal OE received from decoding portion 30. That is, synchronous signal adding portion 34 carries out formatting.

It is assumed here that reference data TR is expressed by n-bit (n≧1) binary numbers. According to the rule above, when the least significant bit of reference data TR that corresponds to the reproduced picture data sent to synchronous signal adding portion 34 is "0" (even), the reproduced picture data corresponds to an even field. When the least significant bit of reference data TR is "1" (odd), therefore, the reproduced picture data corresponds to an odd field.

Further, according to the rule above, the upper half (block B1) and lower half (block B2) of a multiplexed picture are formed of left-eye and light-eye pictures, respectively. According to these rules, therefore, four pictures (odd/even fields of a light-eye picture, and odd/even fields of a left-eye picture) can be discriminated by discriminant signal OE. Synchronous signal adding portion 34 adds a synchronous signal to the reproduced picture data based on discriminant signal OE.

An operation of the receiver will be described with reference to FIGS. 5A to 5C. The arrows connecting FIGS. 5A and 5B indicate relations between encoded pictures and reproduced pictures. In FIG. 5A, the symbols of I, B and P denote I, B and P pictures, respectively. In FIGS. 5C and 5B, the symbols of EVEN and ODD denote even and odd fields, respectively, while the symbols of A, B, C, . . . denote reproduced pictures.

Decoding block 28 receives a plurality of encoded pictures (a plurality of MPEG picture data) forming a GOP in the order as shown in FIG. 5A. Reproduced picture data is generated by decoding portion 30. The reproduced picture data is stored in memory 32. As shown in FIG. 5B, according to reference data TR, corresponding reproduced picture data is read from memory 32 and transmitted to synchronous signal adding portion 34. As shown in FIG. 5C, synchronous signal adding portion 34 adds a synchronous signal to each of left-eye picture data L of the first 240 lines (upper half or block B1) forming reproduced picture data and right-eye picture data R of the remaining 240 lines (lower half or block B2) based on discriminant signal OE.

Figure 6A:
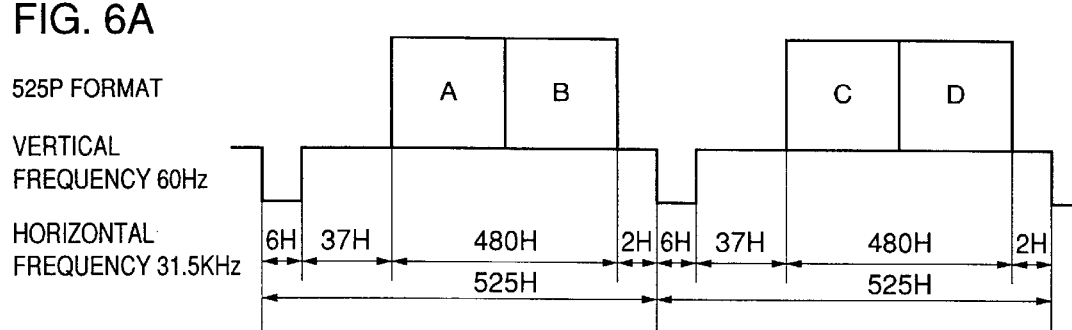
FIGS. 6A to 6C illustrate picture data formats in the first embodiment.
Figure 6B:
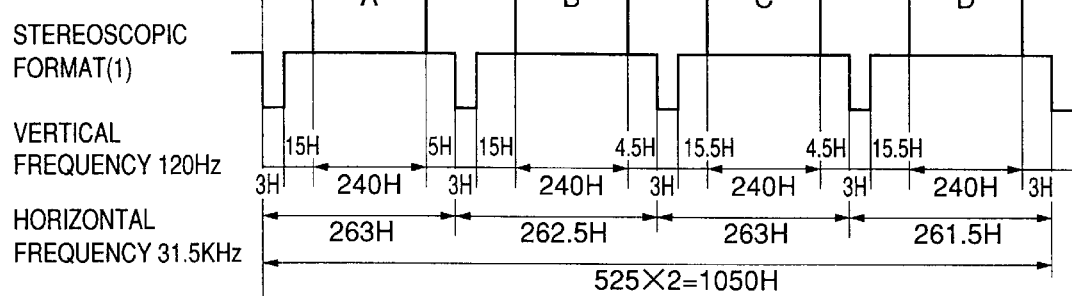
Figure 6C:
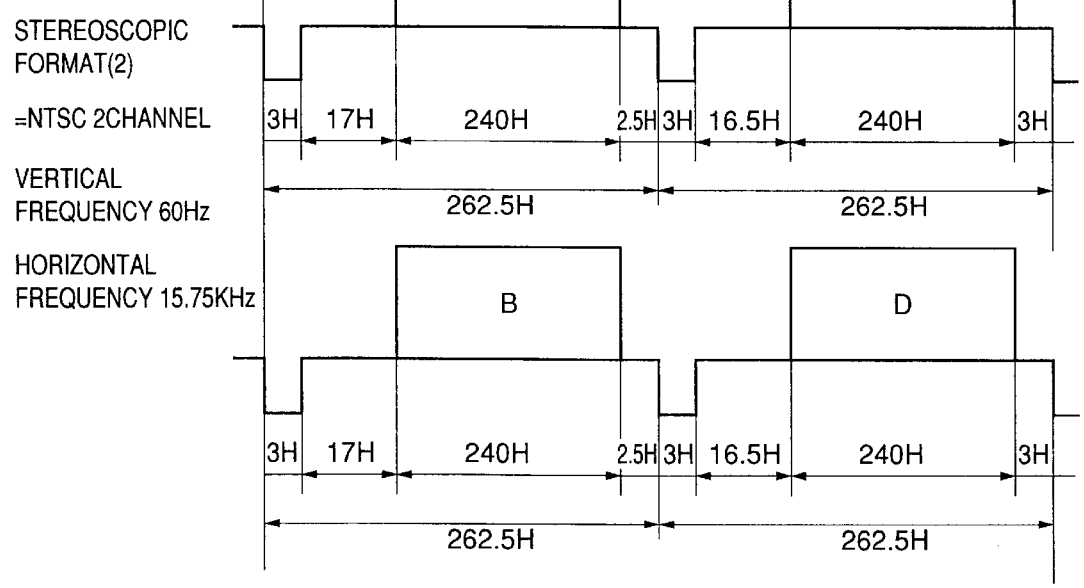

FIGS. 6A to 6C illustrate picture data formats in the first embodiment. FIG. 6A shows a format of picture data to be transmitted and received (525P format). FIG. 6B shows an example of the format of picture data obtained by adding synchronous signals (stereoscopic format (1)). FIG. 6C shows an example of the format of picture data obtained by adding synchronous signals (stereoscopic format (2)). In FIGS. 6A to 6C, the symbols of A and C correspond to left-eye pictures while the symbols of B and D correspond to right-eye pictures.

Referring to FIG. 6A, one vertical period of the 525P format has 525 horizontal periods. One horizontal period is denoted by "H." The vertical period consists of a vertical synchronizing period (6H) for adding a vertical synchronizing pulse to synchronous signal level data, an equalizing pulse period (37H) for adding an equalizing pulse to pedestal level data, a period (480H) for adding picture data itself, and an equalizing pulse period (2H).

The stereoscopic format (1) shown in FIG. 6B corresponds to monitor 60 which displays a left-eye picture in an even field, a right-eye picture in an even field, a left-eye picture in an odd field, and a right-eye picture in an odd field in this order. One vertical period of the stereoscopic format (1) has 525×2 (1050)H as shown in FIG. 6B. The vertical period consists of a period corresponding to an even field and a left-eye picture (referred to as a first period, 263H), a period corresponding to an even field and a right-eye picture (referred to as a second period, 262.5H), a period corresponding to an odd field and a left-eye picture (referred to as a third period, 263H), and a period corresponding to an odd field and a right-eye picture (referred to as a fourth period, 261.5H).

The first period consists of a vertical synchronizing period (3H), an equalizing pulse period (15H), a period (240H) for adding picture data, and an equalizing pulse period (5H). The second period consists of a vertical synchronizing period (3H), an equalizing pulse period (15H), a period (240H) for adding picture data, and an equalizing pulse period (4.5H). The third period consists of a vertical synchronizing period (3H), an equalizing pulse period (15.5H), a period (240H) for adding picture data, and an equalizing pulse period (4.5H). The fourth period consists of a vertical synchronizing period (3H), an equalizing pulse period (15.5H), a period (240H) for adding picture data, and an equalizing pulse period (3H).

The stereoscopic format (2) shown in FIG. 6C corresponds to monitor 60 which is for display using a two-channel picture signal in which one channel is for alternately displaying right-eye pictures in even and odd fields and the other channel is for alternately displaying left-eye pictures in even and odd fields. The vertical period of the stereoscopic format (2) has 262.5H as shown in FIG. 6C.

The vertical period for an even field consists of a vertical synchronizing period (3H), an equalizing pulse period (17H), a period (240H) for adding picture data, and an equalizing pulse period (2.5H). The vertical period for an odd field consists of a vertical synchronizing period (311), an equalizing pulse period (16.5H), a period (240H) for adding picture data, and an equalizing pulse period (3H).

Referring to FIG. 4, a picture signal to which a synchronous signal has been added in synchronous signal adding portion 34 is converted to an analog picture signal by D/A converter 36. Thereafter, the signal is output to monitor 60.

In this embodiment, MPEG encoding is carried out so that multiplexed pictures (left-eye and right-eye pictures) in an even field become encoded pictures which have reference data TR=0. However, MPEG encoding is not limited to this manner but it may be carried out so that multiplexed pictures in an odd field become encoded pictures which have reference data TR=0.

In this case, discriminant signal OE indicating an odd field picture is output to synchronous signal adding portion 34 if reference data TR corresponding to a reproduced picture, which is sent to synchronous signal adding portion 34, is even, and discriminant signal OE indicating an even field picture is output to synchronous signal adding portion 34 if reference data TR is odd.

Further, the GOP structure is not limited to the one shown in FIG. 3A. Any GOP structure including an even number of encoded pictures is sufficient. The input of the receiver is not always given by antenna 22. The receiver may receive, for example, picture data, which is encoded according to a rule, from a recording and reproducing device (such as a personal computer hard disk, a DVD, a DVD-RAM, a D-VTR, an MD, and a magneto-optical disk).

Second Embodiment

A second embodiment will be described based on a case in which the present invention is applied to the broadcasting service for providing two pictures (except stereoscopic broadcasting) synchronous with each other. In the following, the components common to the first embodiment are denoted by the same reference characters and their description will not be repeated.

Figure 7:
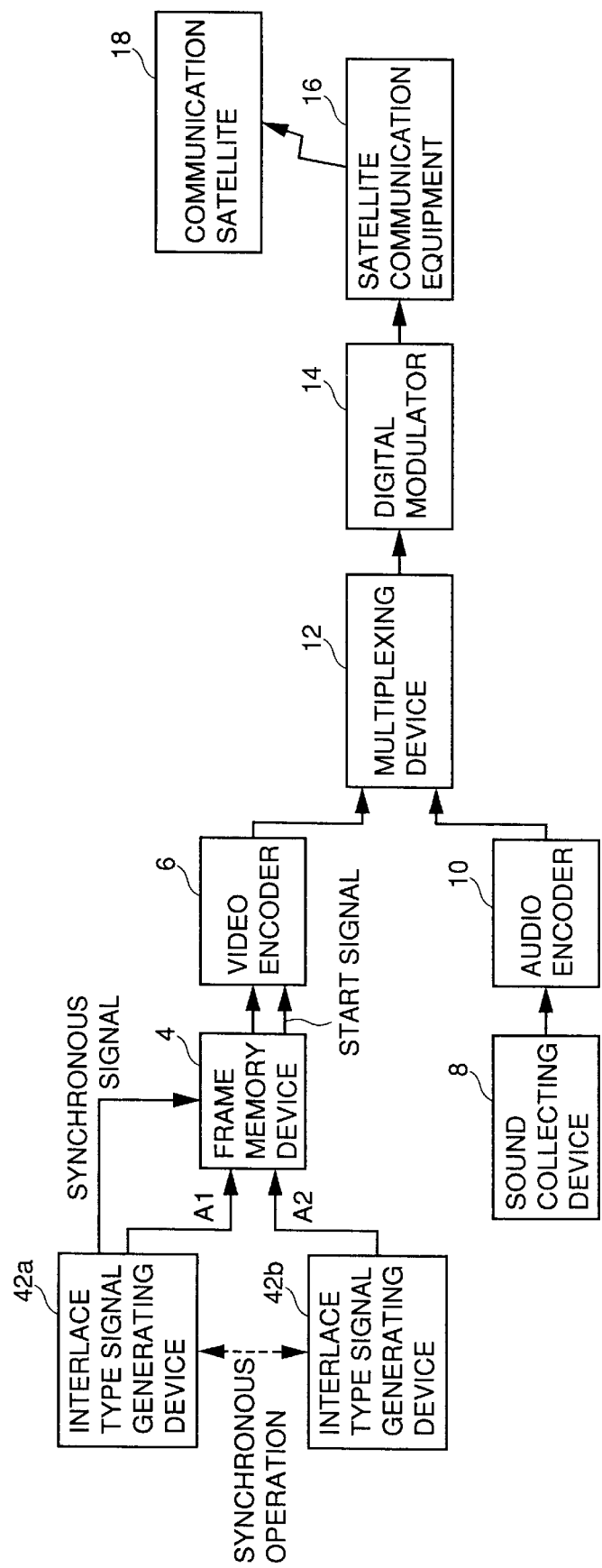
FIG. 7 is a block diagram for describing one example of the structure of a transmitter in a digital broadcasting system in a second embodiment.

One example of the structure of a transmitter in a digital broadcasting system in the second embodiment will be described with reference to FIG. 7. Referring to FIG. 7, the transmitter in the digital broadcasting system includes interlace scanning type signal generating devices 42a, 42b (VTRs and cameras, for example) as the input devices of pictures. Interlace scanning type signal generating devices 42a, 42b are synchronously operated. Interlace scanning type signal generating devices 42a, 42b output picture data A1 (first picture) and picture data A2 (second picture), respectively.

Frame memory device 4 receives a total of two fields of picture data A1, A2 from interlace scanning type signal generating devices 42a, 42b, converts the data into one-frame picture data (multiplexed picture data), and outputs it. Specifically, frame memory device 4 includes two field memories as described in the first embodiment. One filed memory is written picture data while the other field picture is written picture data. At a speed twice as high as the writing frequency, picture data Al and picture data A2 are successively read from one field memory and the other field memory. Thus, a multiplexed picture formed by multiplying two pictures is obtained. In the following example, block B1 shown in FIG. 2C is a picture that corresponds to the first picture (picture data A1) and block B2 is a picture that corresponds to the second picture (picture data A2).

The multiplexed picture is MPEG-encoded in video encoder 6. At this time, encoding is carried out so that a multiplexed picture of a prescribed field type (even or odd) becomes an encoded picture which has prescribed reference data TR as described in the first embodiment.

It is assumed in the following example that, when reference data TR is 0~N-1, a multiplexed picture corresponding to an even field becomes an encoded picture which has "0" as reference data TR. Further, the number N of encoded pictures forming the GOP is even and the encoding operation is as described in the first embodiment. Encoded multiplexed picture data is processed in a circuit at a subsequent stage and transmitted to communication satellite 18 by a one-channel transmission path.

Figure 8:
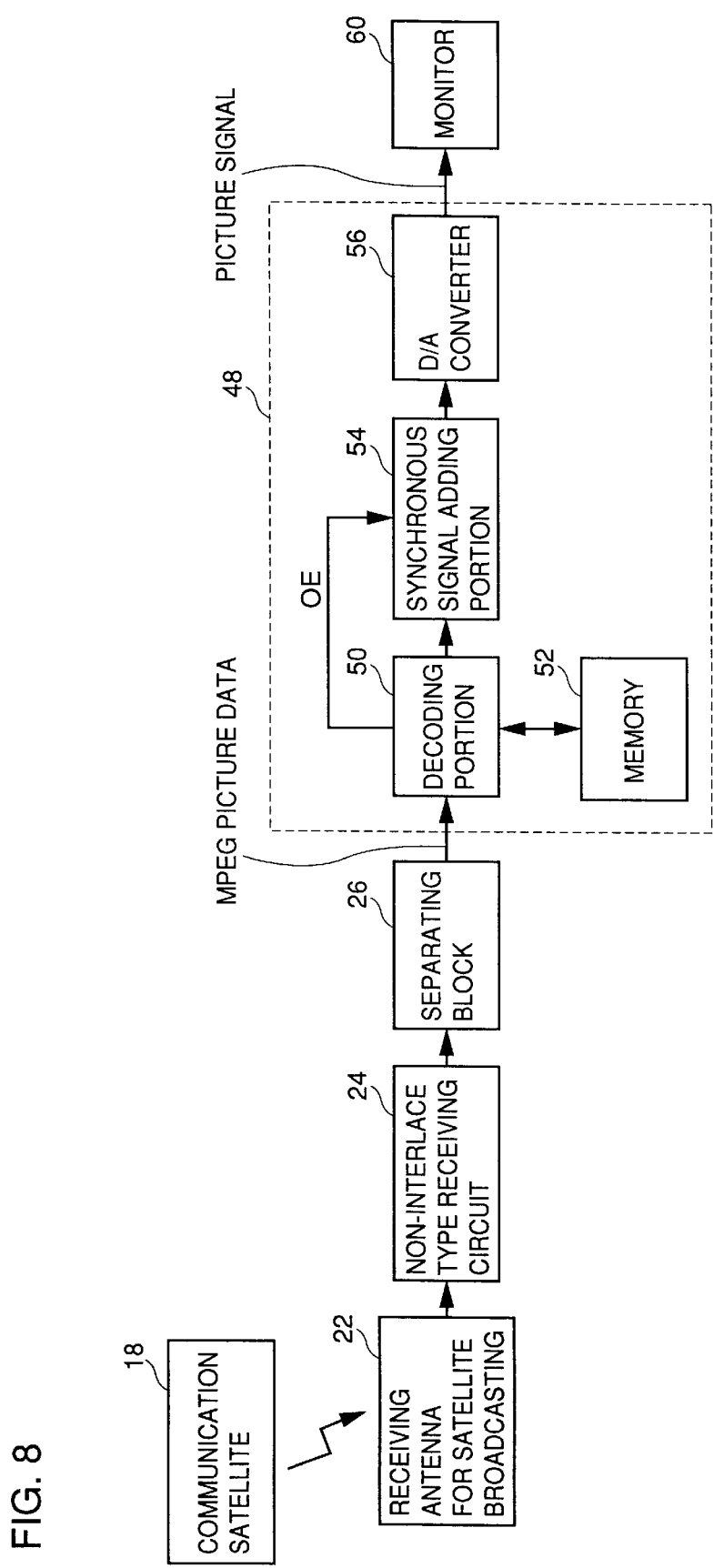
FIG. 8 is a block diagram for describing one example of the structure of a receiver in a digital broadcasting system in the second embodiment.

One example of the structure of a receiver in the digital broadcasting system in the second embodiment will be described in the following with reference to FIG. 8. Referring to FIG. 8, the receiver includes an antenna 22, a receiving circuit 24, a separating block 26, and a decoding block 48.

The receiver receives one-channel, encoded multiplexed picture data, which is transmitted from communication satellite 18, by receiving antenna 22 for satellite broadcasting. Receiving circuit 24 carries out digital demodulation, error correction and the like on received data. Separating block 26 separates the data into MPEG picture data and sound data. The MPEG picture data is sent to decoding block 48.

Decoding block 48 includes a decoding portion 50, a memory 52, a synchronous signal adding portion 54, and a D/A converter 56. Decoding portion 50 decodes MPEG picture data received from separating block 26. Thus, reproduced picture data is generated. The reproduced picture data is stored in memory 52 for a while. I and P pictures of the stored reproduced picture data are used as reference pictures for decoding a P or B picture.

Decoding portion 50 reads the reproduced picture data from memory 52 based on reference data TR which has been added to the MPEG picture data before reproduction (according to a displaying order). At the same time, decoding portion 50 outputs discriminant signal OE. Discriminant signal OE indicates that the reproduced picture data, which is read, corresponds to an even field if reference data TR is even and indicates that the reproduced picture data, which is read, corresponds to an odd field if reference data TR is odd.

Synchronous signal adding portion 54 adds synchronous signals to the read reproduced picture data based on discriminant signal OE received from decoding portion 50. That is, synchronous signal adding portion 54 carries out formatting.

It is assumed that reference data TR is expressed by n-bit ($n \geq 1$) binary numbers. According to the rule above, when the least significant bit of reference data TR corresponding to the reproduced picture data, which is sent to synchronous signal adding portion 54, is "0" (even), the reproduced picture data corresponds to an even field. When the least significant bit of reference data TR is "1" (odd), however, the reproduced picture data corresponds to an odd filed.

According to the rule above, the upper half (block B1) and lower half (block B2) of a multiplexed picture are formed of the first and second pictures, respectively. According to these rules, therefore, four pictures (odd/even fields of the first picture, and odd/even fields of the second picture) are discriminated by discriminant signal OE. Synchronous signal adding portion 54 adds synchronous signals based on discriminant signal OE.

An operation of the receiver will be described with reference to FIGS. 9A to 9C. The arrows connecting FIGS. 9A and 9B indicate relations between encoded pictures and reproduced pictures. In FIG. 9A, the symbols of I, B and P denote I, B and P pictures, respectively. In FIGS. 9A to 9C, the symbols of EVEN and ODD denote even and odd fields and the symbols of A, B, C, . . . denote reproduced pictures.

Decoding block 48 receives a plurality of encoded pictures (a plurality of MPEG picture data) forming a GOP in the order as shown in FIG. 9A. Reproduced picture data is generated by decoding portion 50. The reproduced picture data is stored in memory 52. As shown in FIG. 9B, according to reference data TR, corresponding reproduced picture data is read from memory 52 and transmitted to synchronous signal adding portion 54. As shown in FIG. 9C, synchronous signal adding portion 54 adds a synchronous signal for each of picture data Al of the first 240 lines (upper half or block B1) forming the reproduced picture data and picture data A2 of the remaining 240 lines (lower half or block B2) based on discriminant signal OE.

As a result, certain first and second pictures that proceeds simultaneously and are picked up from angles different from each other can be provided for users through a one-channel transmission path. The users cause monitor 60 to selectively display one picture of the simultaneously proceeding, different pictures. Thus, various broadcasting services can be provided.

In the embodiment, MPEG encoding is carried out so that a multiplexed picture in an even field becomes an encoded picture that has reference data TR=0. However, MPEG encoding is not limited to this manner. It may be carried out so that a multiplexed picture in an odd field becomes an encoded picture that has reference data TR=0.

In this case, discriminant signal OE indicating an odd field picture is output to synchronous signal adding portion 54 if reference data TR corresponding to reproduced picture data TR, which is sent to synchronous signal adding portion 54, is even while discriminant signal OE indicating an even field picture is output to synchronous signal adding portion 54 if reference data is odd.

Further, the GOP structure is not limited to the one shown in FIG. 3A. Any GOP structure including an even number of encoded pictures is sufficient. The input of the receiver is not always given by antenna 22. The receiver may receive, for example, picture data, which is encoded according to a rule, from a recording and reproducing device (such as a personal computer hard disk, a DVD, a DVD-RAM, a D-VTR, an MD, and a magneto-optical disk).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital broadcasting system, comprising:
    a picture producing circuit for producing a plurality of multiplexed pictures, each formed of a plurality of original pictures, and encoding said plurality of multiplexed pictures to produce a plurality of encoded pictures forming a GOP structure based on an MPEG method, said encoded picture based on the MPEG method having reference data added, said reference data indicating a displaying order regarding whether the encoded picture corresponds to an odd field or an even field;
    a transmitting circuit for transmitting an output of said picture producing circuit to a one-channel transmission path;

a receiving circuit for receiving an output of said transmitting circuit through said one-channel transmission path;

a decoder for decoding said plurality of encoded pictures received in said receiving circuit to reproduce said plurality of multiplexed pictures and sequentially outputting the pictures according to said displaying order; and a formatting circuit for formatting said reproduced multiplexed pictures output from said decoder to said odd field or said even field based on said displaying order indicated by said reference data added to said encoded picture.

2. The digital broadcasting system according to claim 1, wherein said plurality of multiplexed pictures include a multiplexed picture in said even field and a multiplexed picture in said odd field, said picture producing circuit includes a multiplexing circuit for alternately producing and outputting the multiplexed picture in said even field and the multiplexed picture in said odd field from a prescribed one of them, and an encoder for starting said encoding from a multiplexed picture that is output first from said multiplexing circuit and adding said reference data indicating said displaying order to each of said plurality of encoded pictures, and said formatting circuit adds a synchronous signal of said even field or a synchronous signal of said odd field to said reproduced multiplexed picture according to whether a value of a prescribed bit position of said reference data of said reproduced multiplexed picture is zero or one.

3. The digital broadcasting system according to claim 2, wherein said decoder controls timing for outputting said reproduced multiplexed picture according to said reference data and generates a discriminant signal indicating whether said reproduced multiplexed picture to be output is said even field or said odd field according to whether the value of said prescribed bit position of said reference data is zero or one, and said formatting circuit adds the synchronous signal of said even field or the synchronous signal of said odd field to said reproduced multiplexed picture based on said discriminant signal.

4. The digital broadcasting system according to claim 2, wherein said plurality of original pictures are right-eye and left-eye pictures forming a stereoscopic picture, said decoder controls timing for outputting said reproduced multiplexed picture according to said reference data and generates a discriminant signal indicating whether said reproduced multiplexed picture to be output is said even field or said odd field according to whether the value of said prescribed bit position of said reference data is zero or one, the synchronous signal of said even field includes a first synchronous signal corresponding to said right-eye picture, and a second synchronous signal corresponding to said left-eye picture, the synchronous signal of said odd field includes a third synchronous signal corresponding to said right-eye picture, and a fourth synchronous signal corresponding to said left-eye picture, and said formatting circuit adds said first and second synchronous signals to said right-eye and left-eye pictures included in said reproduced multiplexed picture if said discriminant signal indicates said even field, and adds said third and fourth synchronous signals to said right-eye and left-eye pictures included in said reproduced multiplexed picture if said discriminant signal indicates said odd field.

5. The digital broadcasting system according to claim 1, wherein said picture producing circuit encodes said plurality of multiplexed pictures so that a prescribed one of said even field and said odd field comes first in said displaying order when the pictures are decoded.

6. A digital broadcasting receiver, comprising:

a receiving circuit for receiving through a one-channel transmission path a plurality of encoded pictures forming a GOP structure based on a MPEG method, which are produced by encoding a plurality of multiplexed pictures each including a plurality of original pictures, said encoded picture based on the MPEG method having reference data added, said reference data indicating a displaying order regarding whether the encoded picture corresponds to an odd field or an even field;

a decoder for decoding said received plurality of encoded pictures to reproduce said plurality of multiplexed pictures and sequentially outputting the pictures according to said displaying order; and a formatting circuit for formatting said reproduced multiplexed pictures output from said decoder to said odd field or said even field based on said displaying order indicated by said reference data added to said encoded picture.

7. The digital broadcasting receiver according to claim 6, wherein said plurality of multiplexed pictures alternately include a multiplexed picture in said even field and a multiplexed picture in said odd field, said formatting circuit adds a synchronous signal of said even field or a synchronous signal of said odd field to said reproduced multiplexed picture according to whether a value of a prescribed bit position of said reference data is zero or one.

8. The digital broadcasting receiver according to claim 7, wherein said decoder controls timing for outputting said reproduced multiplexed picture according to said reference data and outputs a discriminant signal indicating whether said reproduced multiplexed picture to be output is said even field or said odd field according to whether the value of said prescribed bit position of said reference data is zero or one, and said formatting circuit adds the synchronous signal of said even field or the synchronous signal of said odd field to said reproduced multiplexed picture based on said discriminant signal.

9. The digital broadcast receiver according to claim 7, wherein said plurality of original pictures are right-eye and left-eye pictures forming a stereoscopic picture, said decoder controls timing for outputting said reproduced multiplexed picture according to said reference data and outputs a discriminant signal indicating whether said reproduced multiplexed picture to be output is said even field or said odd field according to whether the value of said prescribed bit position of said reference data is zero or one, the synchronous signal of said even field includes
- a first synchronous signal corresponding to said right-eye picture, and
- a second synchronous signal corresponding to said left-eye picture, the synchronous signal of said odd field includes
- a third synchronous signal corresponding to said right-eye picture, and
- a fourth synchronous signal corresponding to said left-eye picture, and said formatting circuit adds said first and second synchronous signals to said right-eye and left-eye pictures included in said reproduced multiplexed picture if said discriminant signal indicates said even field, and adds said third and fourth synchronous signals to said right-eye and left-eye pictures included in said reproduced multiplexed picture if said discriminant signal indicates said odd field.

10. The digital broadcasting receiver according to claim 6, wherein
said plurality of multiplexed pictures are encoded so that a prescribed one of said even field and said odd field comes first in said displaying order when the pictures are decoded.

\* \* \* \* \*